(No Model.)

C. M. SMITH.
Churn.

No. 230,154. Patented July 20, 1880.

Witnesses
J. N. Piper
N. W. Lunt

Inventor
Charles M. Smith
by attorney
R. H. Eddy

UNITED STATES PATENT OFFICE.

CHARLES M. SMITH, OF SEATON, IOWA, ASSIGNOR TO HIMSELF AND OREN B. SMITH, OF BOND'S VILLAGE, MASSACHUSETTS.

CHURN.

SPECIFICATION forming part of Letters Patent No. 230,154, dated July 20, 1880.

Application filed March 8, 1880. (No model.)

*To all whom it may concern:*

Be it known that I, CHARLES M. SMITH, of Seaton, of the county of Fayette and State of Iowa, have invented a new and useful Improvement in Churns; and I do hereby declare the same to be described in the following specification, and represented in the accompanying drawings, of which—

Figure 1:
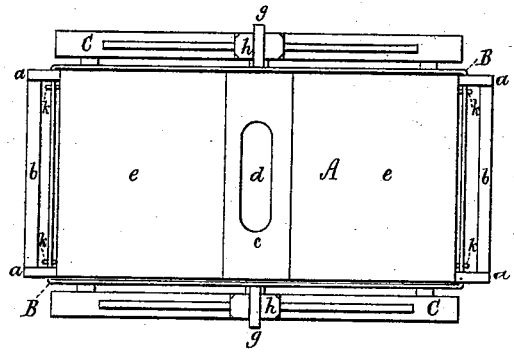
Figure 2:
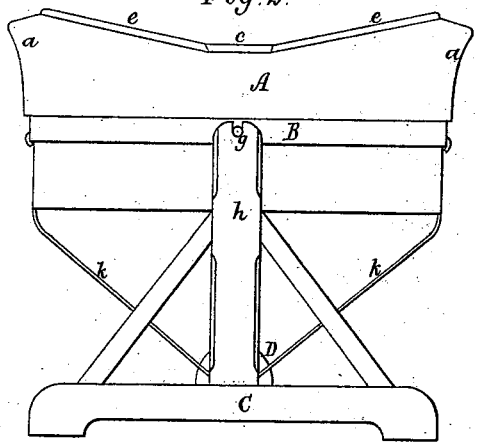
Figure 3:
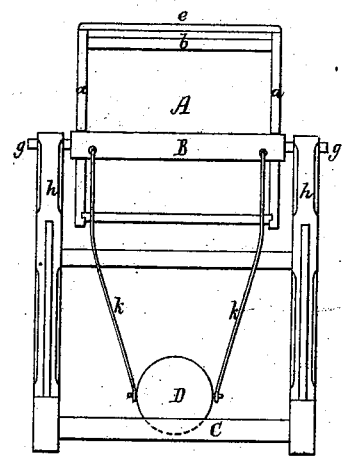
Figure 4:
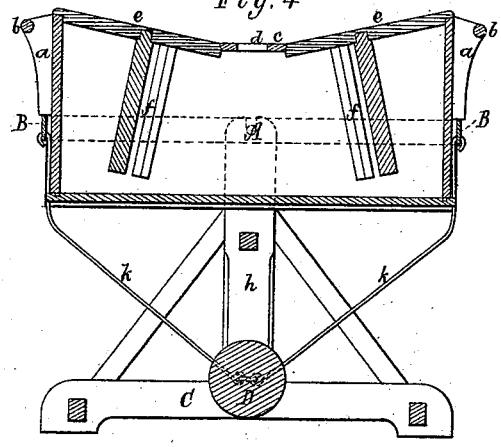
Figure 5:
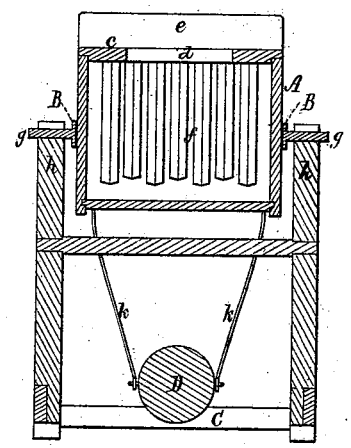

Figure 1 is a top view, Fig. 2 a front elevation, Fig. 3 an end view, Fig. 4 a longitudinal section, and Fig. 5 a transverse section, of a churn embodying my invention.

The reservoir of the said churn is applied to a supporting-frame, so as to be capable of being tilted relatively thereto, and such reservoir has combined with it means of counterbalancing it, as hereinafter described. Furthermore, the reservoir of the churn has three openings in its top, the middle one being what I term the "air-vent." To each of the others there is a cover, from which there projects down within the reservoir a series of prongs. Each cover with its series of prongs I term a "cream-breaker."

The reservoir so made and provided with handles at its opposite ends may have journals at its opposite ends projecting from the middles of its opposite sides and resting in bearings in the upper parts of the posts of a sustaining-frame. I prefer, however, to have such journals project from a receiving-frame, into which the reservoir or churn-body is to be placed, and by which such body is to be supported, the pendulous or counterbalance weight being sustained by arms extending from it to the receiving-frame at or near its corners.

On taking hold of either handle the reservoir, with its receiving-frame, may be so reciprocated or tilted within the supporting-frame as to cause cream, when in the reservoir, to flow alternately from end to end thereof, and between and against the prongs of the breakers, in order that butter may be produced by such operation, the cream being duly aerated in the meantime, as air will readily pass into and out of the vent in the cap-plate between the two covers, the cream at the same time remaining in the reservoir and not escaping by the said vent.

In the drawings, A represents the reservoir, which in this case is a rectangular box, provided at each end with two projections, *a a*, and a handle, *b*, extending from one to the other of them, and arranged as shown. On its upper surface the box slopes in opposite ways toward its middle, across which is extended a cap-plate, *c*, having an elongated hole or air-vent, *d*, arranged in it, as shown.

The box or reservoir in other respects is open at top, and there provided with two removable covers, *e e*, from each of which there is extended downward into the reservoir a series of long prongs, *f*. Each of said covers *e* and its set of prongs *f* I term a "cream-breaker."

The churn-reservoir so made extends into and is supported by a rectangular frame, B, having from the middle of its two opposite sides journals *g g*, projecting into bearings in the tops of the posts *h h* of a supporting-frame, C. Beneath the middle of the reservoir, and connected with the receiving-frame B by four rods, *k*, projecting down therefrom in manner as shown, is a heavy ball or counterbalance-weight, D, whose purpose is to aid in enabling the reservoir to be reciprocated or tilted, first in one and next in the opposite direction.

By having the reservoir sustained by the tilting frame such reservoir may readily be separated therefrom and from the pendulous weight, as occasion may require, for the purpose of being cleansed.

When the reservoir is in the receiving-frame the projections or ears *a* rest directly upon the ends of the frame, such ears thus serving to sustain the reservoir in such frame.

In using this churn for the purpose of obtaining butter from cream, the reservoir, after having been supplied with the requisite amount of cream and what else may be necessary, is to be tilted quickly in opposite directions, so as to cause the cream to flow from one breaker to and through the other, or through them alternately, a churn thus constructed and operated having been found in practice to be highly efficient and easily worked.

What I claim as my invention is as follows, viz:

The combination of the pivoted receiving-frame and the counterbalance-weight applied thereto, as described, with the supporting-stand and the reservoir adapted to such frame, and furnished with projections to sustain handles and to bear upon such frame, as set forth.

CHARLES M. SMITH.

Witnesses:
JOHN DOUGHTY,
S. P. BARNES.